US009078110B2

(12) United States Patent
Yoon

(10) Patent No.: US 9,078,110 B2
(45) Date of Patent: Jul. 7, 2015

(54) RESERVATION TELEPHONE NOTICE METHOD FOR ELECTRONIC DEVICE AND APPARATUS THEREOF

(71) Applicant: Samsung Electronics Co., Ltd, Gyeonggi-do (KR)

(72) Inventor: Jong-Min Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 88 days.

(21) Appl. No.: 13/778,054

(22) Filed: Feb. 26, 2013

(65) Prior Publication Data
US 2013/0237258 A1 Sep. 12, 2013

(30) Foreign Application Priority Data

Mar. 12, 2012 (KR) ........................ 10-2012-0025108

(51) Int. Cl.
H04W 68/00 (2009.01)
H04W 4/16 (2009.01)
(52) U.S. Cl.
CPC ....................................... H04W 4/16 (2013.01)

(58) Field of Classification Search
USPC .............. 455/460, 414.1, 415, 466, 416, 417, 455/418, 419; 379/142.04
See application file for complete search history.

(56) References Cited

U.S. PATENT DOCUMENTS

| 6,731,625 B1* | 5/2004 | Eastep et al. ................... 370/352 |
| 8,160,557 B2* | 4/2012 | White et al. ................... 455/415 |
| 2001/0023182 A1* | 9/2001 | Bach et al. .................... 455/414 |
| 2010/0100387 A1* | 4/2010 | Kuiken et al. ................. 704/270 |
| 2010/0159964 A1* | 6/2010 | Ferro ............................ 455/466 |
| 2010/0208877 A1* | 8/2010 | Meriaz et al. ............. 379/142.04 |
| 2010/0323673 A1* | 12/2010 | Etram et al. ............... 455/414.1 |
| 2012/0202473 A1* | 8/2012 | White et al. ................... 455/415 |

FOREIGN PATENT DOCUMENTS

| KR | 10-2001-0011325 | 2/2001 |
| KR | 10-0685279 | 2/2007 |

* cited by examiner

Primary Examiner — David Q Nguyen

(57) ABSTRACT

According to one embodiment, a method for notifying a reserved call of an electronic device includes registering a schedule of at least one time period, acquiring an outgoing number when an incoming call is rejected, determining a time of notifying the reserved call associated with the outgoing number by referring to the schedule, and notifying the reserved call associated with the outgoing number when the determined time arrives.

20 Claims, 13 Drawing Sheets

RESERVATION TELEPHONE NOTICE METHOD FOR ELECTRONIC DEVICE AND APPARATUS THEREOF

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Mar. 12, 2012 and assigned Serial No. 10-2012-0025108, the entire disclosure of which is hereby incorporated by reference.

TECHNICAL FIELD OF THE INVENTION

The present invention generally relates to telephony devices, and more particularly, to a method and apparatus for notifying a reserved call of an electronic device and apparatus.

BACKGROUND OF THE INVENTION

With the development of electronics communication industries, portable electronic devices, such as mobile communication terminals, cellular phones, electronics organizers, Personal Digital Assistants (PDAs), and the like, have become necessities of modern life as an important means for delivering information among multiple users.

Portable electronic devices often provide a call function. By using these portable electronic devices, users can make calls to other portable electronic devices used by peers, and can receive information from the portable electronic devices of the peer users.

In general, portable electronic devices provide a function of rejecting an incoming call. It's user can selectively receive the incoming call of the portable electronic device. At the moment where the call is rejected while a dial tone is heard, a voice announcement can be provided to a peer user. The call rejection function is effective in a situation where it is difficult to answer the call (e.g., during a business meeting). However, the call rejection may result in the missing of an important call, which can potentially lead to a personal/business loss.

SUMMARY OF THE INVENTION

To address the above-discussed deficiencies of the prior art, it is a primary object to provide a method and apparatus for notifying a reserved call of an electronic device.

Another aspect of the present invention is to provide a method and apparatus for determining a time for notifying a reserved call according to a pre-registered user schedule and for notifying the reserved call when the determined time arrives.

In accordance with a first aspect of the present invention, a method of notifying a reserved call of an electronic device is provided. The method includes registering a schedule of at least one time period, acquiring an outgoing number when an incoming call is rejected, determining a time of notifying the reserved call associated with the outgoing number by referring to the schedule, and notifying the reserved call associated with the outgoing number when the determined time arrives.

In accordance with a second aspect of the present invention, an apparatus configured to notify a reserved call of an electronic device is provided. The apparatus includes at least one processer, a memory, and at least one module stored in the memory and configured to be executable by the at least one processor, wherein the module is configured to register a schedule of at least one time period, acquire an outgoing number when an incoming call is rejected, determine a time of notifying the reserved call associated with the outgoing number by referring to the schedule, and notify the reserved call associated with the outgoing number when the determined time arrives.

In accordance with a third aspect of the present invention, an apparatus for notifying a reserved call of an electronic device is provided. The apparatus includes means for registering a schedule of at least one time period, means for acquiring an outgoing number when an incoming call is rejected, means for determining a time of notifying the reserved call associated with the outgoing number by referring to the schedule, and means for notifying the reserved call associated with the outgoing number when the determined time arrives.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable electronic devices. Exemplary embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

The present invention relates to a method and apparatus for notifying a reserved call of an electronic device which notifies the reserved call at a time determined according to a user's schedule.

The present invention provides a method and apparatus for notifying a reserved call of an electronic device which makes a call at a specific time to an outgoing number of a rejected call.

According to embodiments of the present invention, a proper time for notifying the reserved call is determined according to a pre-registered user schedule, and the reserved call is notified when the determined time arrives. Eventually, since the method and apparatus for notifying the reserved call of the electronic device notifies the reserved call associated with the outgoing number of the rejected call, the call can be prevented from missing calls caused by the call rejection, and the reserved call is notified at the proper time according to the user's schedule, which may increase user satisfaction.

Figure 1:
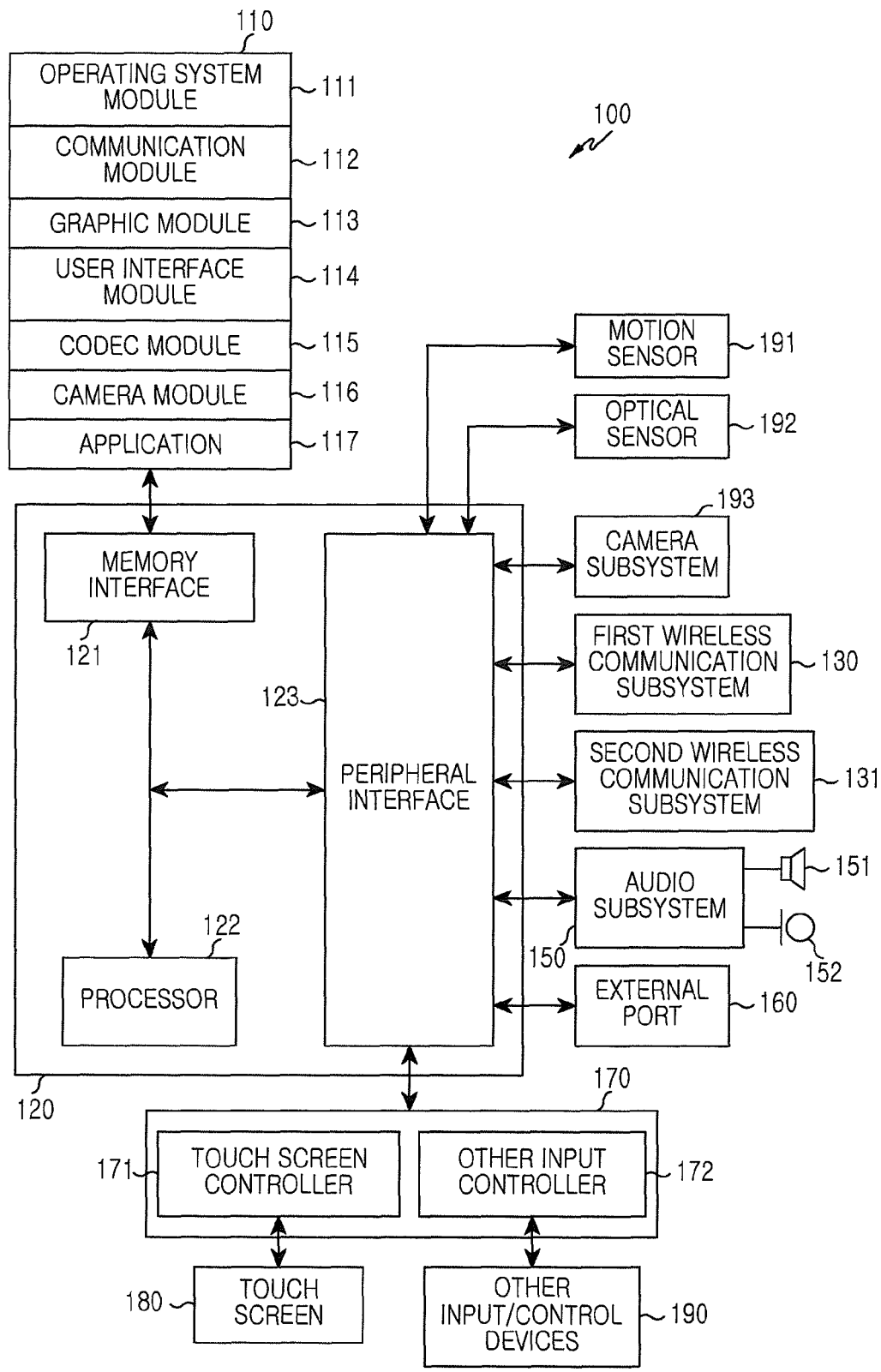
FIG. 1 illustrates an example structure of an electronic device according to an embodiment of the present invention.

FIG. 1 illustrates an example structure of an electronic device according to an embodiment of the present invention. The electronic device 100 may be a portable electronic device. Examples of the electronic device may include a mobile phone, a mobile pad, a media player, a tablet computer, a hand-held computer, or a Personal Digital Assistance (PDA). Further, the electronic device may be any electronic device including a device which combines any two or more functions of the aforementioned devices.

The electronic device 100 includes a memory 110, a processor unit 120, a first radio communication sub-system 130, a second radio communication sub-system 131, an external port 160, an audio sub-system 150, a speaker 151, a microphone 152, an input/output system 170, a touch screen 180, and an extra input/control units 190. The memory 110 and the external port 160 may include multiple memories and external ports, respectively.

The processor unit 120 includes a memory interface 121, one or more processors 122, and a peripheral device interface 123. All components of the processor unit 120 may be referred to as a processor. The memory interface 121, the one or more processors 122, and/or the peripheral device interface 123 may be separate components or may be configured as one or more integrated circuits.

The processor 122 performs functions for the electronic device 100 by executing various software programs, and processes and controls audio communication, video communication, and data communication. Further, in addition to typical functions, the processor 122 executes a software module (or an instruction set) stored in the memory 110 and performs various functions corresponding to the module. Furthermore, in addition to the typical functions, the processor 122 executes a specific software module (or an instruction set) stored in the memory 110 and thus performs various specific functions corresponding to the module. That is, the processor 122 performs the method according to the exemplary embodiment of the present invention by interworking with the software module stored in the memory 110.

According to embodiments of the present invention, the processor 122 receives at least one time schedule from a user and stores the schedule in the memory 110. In a call rejection case, the processor 122 acquires an outgoing number associated with the rejected call, determines a time of notifying a reserved call associated with the outgoing number, and notifies the reserved call associated with the outgoing number when the determined time arrives.

The processor 122 may include one or more data processors, an image processor, or a COder/DECoder (CODEC). The electronic device 100 may separately configure the data processor, the image processor, or the CODEC. The peripheral device interface 123 connects the input/output system 170 of the electronic device 100 and several peripheral devices to the processor 122. In addition, the peripheral device interface 123 connects the input/output system 170 of the electronic device 100 and the several peripheral devices to the memory 110 via the memory interface 121.

Various components of the electronic device 100 can be connected by using one or more communication buses (reference numeral is not shown) or any suitable communication line (not shown).

The external port 160 directly connects the electronic device 100 to another electronic device, or indirectly connects it to another electronic device through a network (e.g., internet, intranet, wireless Local Area Network (LAN), and the like). For example, the external port 160 indicates a Universal Serial Bus (USB) port or a FIREWIRE port, but the present invention is not limited thereto.

A motion sensor 191 and an optical sensor 192 are coupled to the peripheral device interface 123 to enable various functions. For example, the motion sensor 191 and the optical sensor 192 may be coupled to the peripheral device interface 123 to detect a motion of the electronic device 100 or to detect an external light beam. In addition, other sensors such as a location sensor, a temperature sensor, a bio sensor, and the like, may be coupled to the peripheral device interface 123 to perform related functions.

A camera sub-system 193 can perform a camera function such as capturing, video clip recoding, etc. The optical sensor 192 may be a Charge Coupled Device (CCD) device or a Complementary Metal-Oxide-Semiconductor (CMOS) device for the camera sub-system 193.

The first and second radio communication sub-systems 130 and 131 provide communication. The first and second radio communication sub-systems 130 and 131 may include a radio frequency receiver and transceiver, and/or an optical (e.g., infra-red ray) receiver and transceiver. The first communication sub-system 130 and the second communication sub-system 131 can be identified according to a communication network.

For example, the first radio communication sub-system 130 and the second radio communication sub-system 131 may operate according to one of a Global System for Mobile (GSM) network, an Enhanced Data rate for Global Evolution (EDGE) network, a Code Division Multiple Access (CDMA) network, a Wideband-CDMA (W-CDMA) network, a Long Term Evolution (LTE) network, an Orthogonal Frequency Division Multiple Access (OFDMA) network, a Wi-Fi network, a WiMax network, and/or a Bluetooth network.

The audio sub-system 150 is coupled to a speaker 151 and a microphone 152 to provide an audio input and output, such as voice recognition, voice recoding, digital recording, telephony, and the like. That is, the audio sub-system 150 communicates with the user using the speaker 151 and the microphone 152. The audio sub-system 150 receives a data signal via the peripheral device interface 123 of the processor unit 120, converts the received data signal into an electronic signal, and provides the converted electronic signal to the speaker 151.

The speaker 151 outputs the electronic signal by converting it to a sound wave audible by a human user. The microphone 152 converts the sound wave delivered from the human user or other sound sources into an electronic signal. The audio sub-system 150 receives the electronic signal from the microphone 152, converts the received electronic signal into an audio data signal, and transmits the converted audio data signal to the peripheral device interface 123. The audio sub-system 150 may include an attachable/detachable ear-phone, a head-phone, or a head-set.

The input/output system 170 includes a touch screen controller 171 and/or an extra input controller 172. The touch screen controller 171 is coupled to the touch screen 180, and determines a touch event such as a touch contact, a touch motion, and the like, by using the touch screen 180. The touch screen 180 and the touch screen controller 171 can use not only a capacitance, resistance, infra-red ray, surface sound wave technique, but also any multi-touch sensing technique including extra proximity sensor arrays or other elements. The extra input controller 172 may be integrally formed with the extra input/control units 190. The extra input/control units 190 may include an up/down button for volume control. In addition, the extra input/control units 190 may include at least one pointer means for providing a corresponding function, for example, a push button, a locker button, a locker switch, a thumb wheel, a dial, a stick, a stylus, and the like.

The touch screen 180 provides an input and output interface between the electronic device 100 and the user. The touch screen 180 delivers a touch input of the user to the electronic device 100, and shows visual information (e.g., text, graphic, video, etc.) provided form the electronic device 100 to the user.

In general, the touch screen 180 is a display to which a touch panel, a touch sensor, or the like is attached. There are various types of display. For example, the display may be any one of a Liquid Crystal Display (LCD), a Light-Emitting Diode (LED), a Laser Phosphor Display (LPD), an Organic Light-Emitting Display (OLED), an Active-Matrix Organic Light-Emitting Diode (AMOLED), and a Flashing Light Emitting Diode (FLED).

The memory 110 is coupled to the memory interface 121, and includes a fast random access memory such as one or more magnetic disc storage devices and/or a non-volatile memory, one or more optical storage devices, and/or a flash memory (e.g., NAND and NOR).

The memory 110 stores one or more software elements. The software elements may include an operating system module 111, a communication module 112, a graphic module 113, a user interface module 114, a CODEC module 115, a camera module 116, one or more application modules 117, etc. The terminology of "module" may also expressed as a group of instructions, an instruction set, or a program.

The operating system module 111 may include any type, such as WINDOWS, LINUX, Darwin, RTXC, UNIX, OS X, or VxWorks, and includes various software components for controlling a general system operation. The control of the general system operation includes memory management and control, storage hardware (device) control and management, power control and management, etc. In addition, the operating system module performs facilitates communication between various hardware elements (devices) and software elements (modules).

The communication module 112 may provide communication with a peer electronic device such as a server, a portable terminal, etc., via the radio communication sub-systems 130 and 131 or the external port 160.

The graphic module 113 includes various software components for providing and displaying graphics on the touch screen 180. The terminology of "graphics" indicates a text, a web page, an icon, a digital image, a video, an animation, and the like.

The user interface module 114 includes various software components related to a user interface. In addition, the user interface module 114 includes the content related to a change in a state of the user interface and a certain condition which changes the state of the user interface.

The CODEC module 115 includes one or more software components related to encoding and decoding of a video file.

The camera module 116 includes one or more camera-related software components which enables camera-related processes and functions.

The application module 117 includes a browser, an e-mail, an instant message, word processing, keyboard emulation, an address book, a contact list, a widget, a Digital Right Management (DRM), voice recognition, voice recoding, a location determination function, a location-based service, and the like. In addition to the aforementioned modules, the memory 110 may further include additional modules (instructions).

In particular, the application module 117 includes a user schedule management function. The processor 122 permits the user to use a certain process for dividing a time period and for registering a schedule for each time period. In addition, the application module 117 includes a function of notifying a reserved call. The processor 122 uses the schedule to determine a time of notifying the reserved call if an incoming call is rejected, and notifies the reserved call associated with a phone number of the rejected call when the determined time arrives.

Various functions of the electronic device 100 of the present invention can be performed by using at least one stream processing and/or a hardware component including an Application Specific Integrated Circuit (ASIC) and/or a software component and/or a combination thereof.

Figure 2:
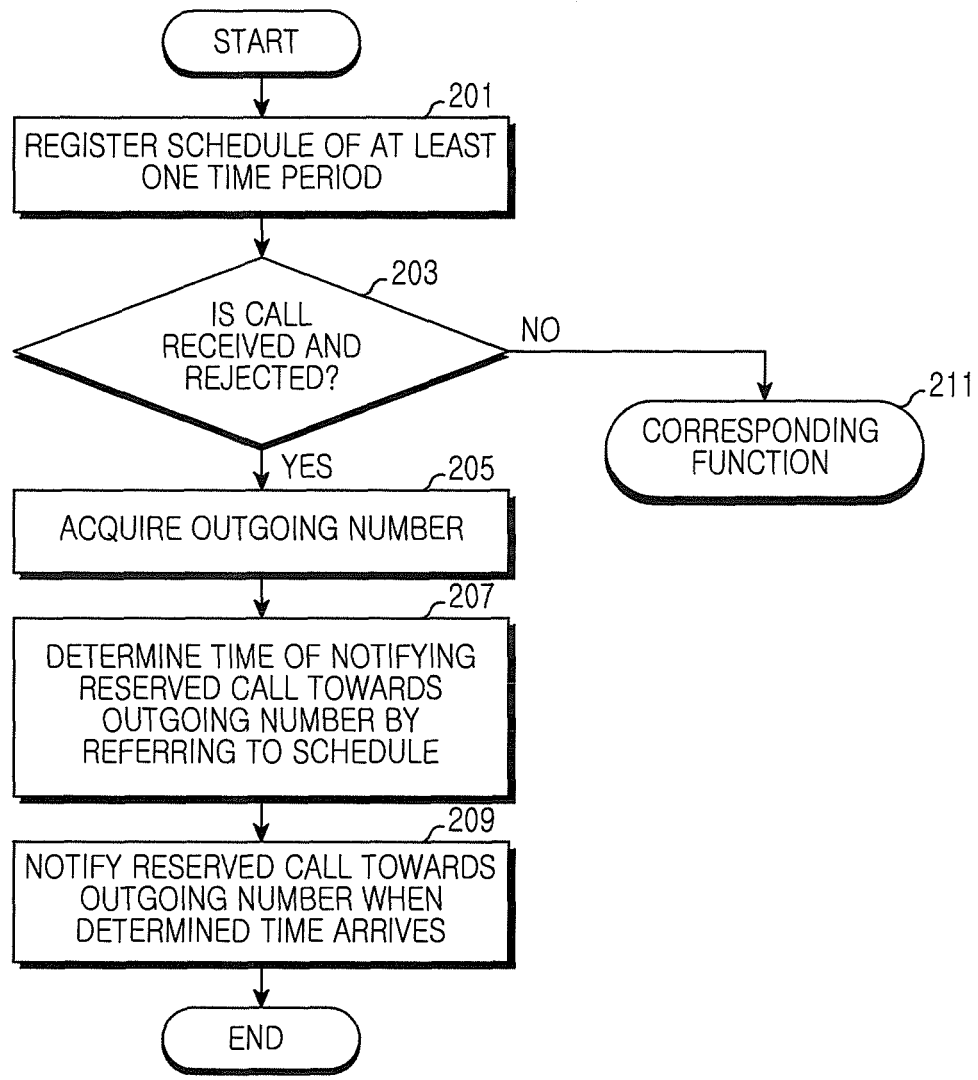
FIG. 2 illustrates an example process of notifying a reserved call of an electronic device according to an embodiment of the present invention.

FIG. 2 illustrates an example process of notifying a reserved call of an electronic device according to an embodiment of the present invention.

Referring to FIG. 2, the processor 122 receives a schedule which is input from a user for at least one time period (step 201).

When a call is received and the incoming call is not rejected (step 203), the processor 122 performs a corresponding function (as indicated by 111 in FIG. 1). For example, when the user presses a call button, the processor 122 receives the incoming call.

If the call is received and the incoming call is rejected (step 203), step 205 and its subsequent steps are repeated.

The processor 122 acquires an outgoing number of the rejected call (step 205).

The processor 122 determines a time of notifying the reserved call associated with the outgoing number by referring to the schedule (step 207). A detailed process of step 207 will be described with reference to FIG. 3 and FIG. 9.

The processor 122 notifies the reserved call associated with the outgoing number when the determined time arrives (step 209).

Figure 3:
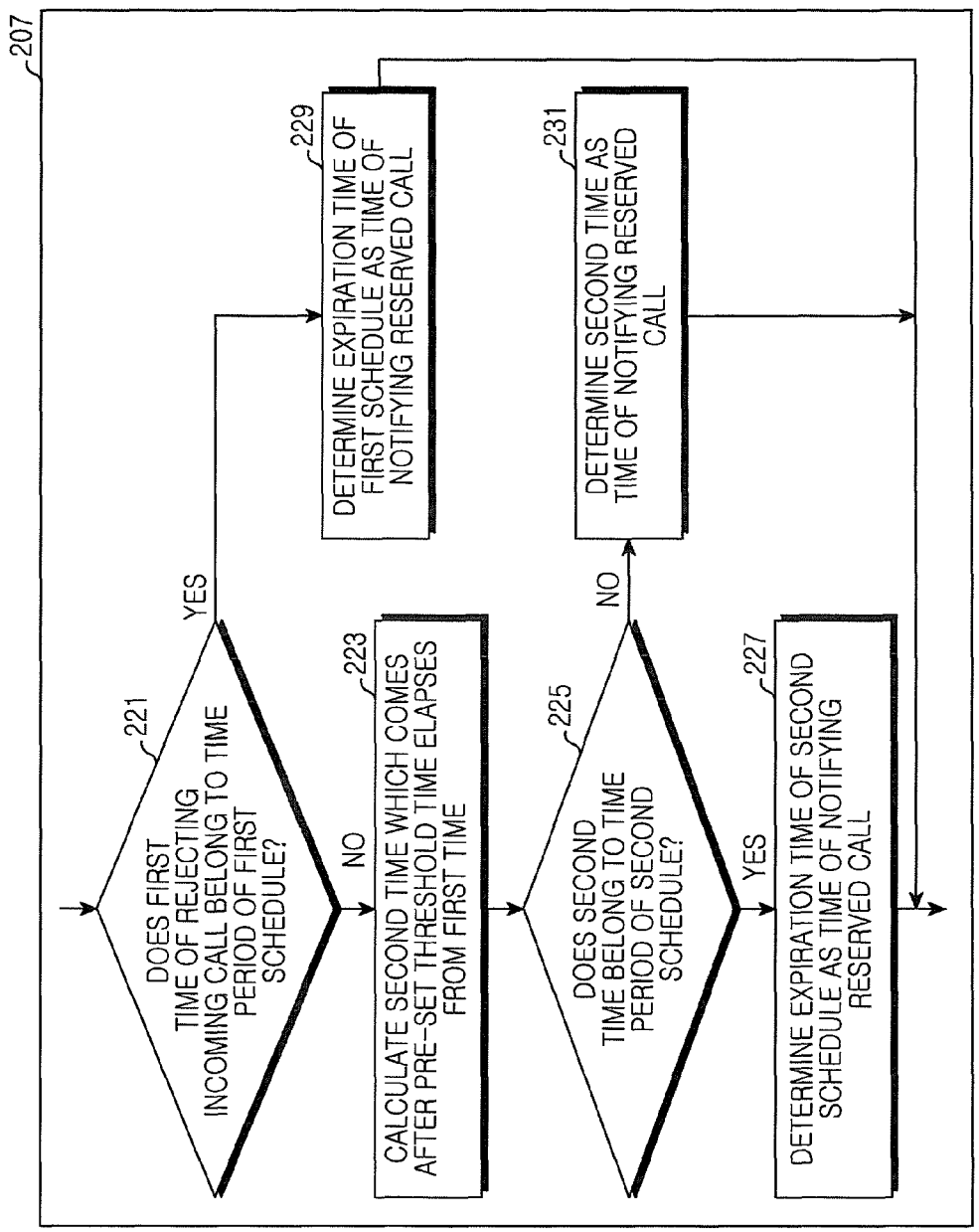
FIG. 3 illustrates an example process of determining a time of notifying a reserved call associated with an outgoing number of a rejected call by referring to a schedule according to an embodiment of the present invention.

FIG. 3 illustrates an example process of determining a time of notifying a reserved call associated with an outgoing number of a rejected call by referring to a schedule according to an embodiment of the present invention.

Referring to FIG. 3, the processor 122 identifies whether a first time of rejecting an incoming call belongs to a time period of a first schedule (step 221). The time period represents a specific duration from one specific time to another specific time. The time period of the first schedule may represent a time period of one schedule or a time period of a plurality of continuous schedules.

If the first time of rejecting the incoming call belongs to the time period of the first schedule, the processor 122 determines an expiration time of the first schedule as a time of notifying the reserved call (step 229). If the time period of the first schedule is a time period of a plurality of contiguous schedules, the processor 122 determines an expiration time of a last schedule as the time of notifying the reserved call. Otherwise, if the first time of rejecting the incoming call does not belong to the time period of the first schedule, the processor 122 calculates a second time which comes after a pre-set threshold time elapses from the first time (step 223).

The processor 122 identifies whether the second time belongs to the time period of the second schedule (step 225). The time period of the second schedule indicates a time period of one schedule or a time period of a plurality of continuous schedules.

If the second time does not belong to the time period of the second schedule, the processor 122 determines the second time as the time of notifying the reserved call (step 231). Otherwise, if the second time belongs to the time period of the second schedule, the processor 122 determines an expiration time of the second schedule as the time of notifying the reserved call (step 227). If the time period of the second schedule is a time period of a plurality of continuous schedules, the processor 122 determines the expiration time of the last schedule as the time of notifying the reserved call.

FIG. 4 through FIG. 8 illustrate an example user interface screen according to an embodiment of the present invention.

Referring to FIG. 4 to FIG. 8, the electronic device 100 provides a first slide bar 411 configured to receive a call and connecting the incoming call and a second slide bar 413 configured to reject the incoming call by using a touch screen (step 41). When a user moves the first slide bar 411 from the left to the right, the electronic device 100 connects the incoming call. Otherwise, if the user moves the second slide bar 413 from the right to the left, the electronic device 100 rejects the incoming call (step 42). The electronic device 100 determines a time of notifying a reserved call associated with an outgoing number of the rejected call by referring to a schedule of the user, and notifies the reserved call associated with the outgoing number when the determined time arrives (step 43). When the reserved call is notified, the electronic device 100 provides information of the rejected call, i.e., a phone number, a call rejection time, and the like, and enables the user to determine whether to make a call to the phone number.

The electronic device 100 determines the time of notifying the reserved call by using the following methods.

Figure 4:
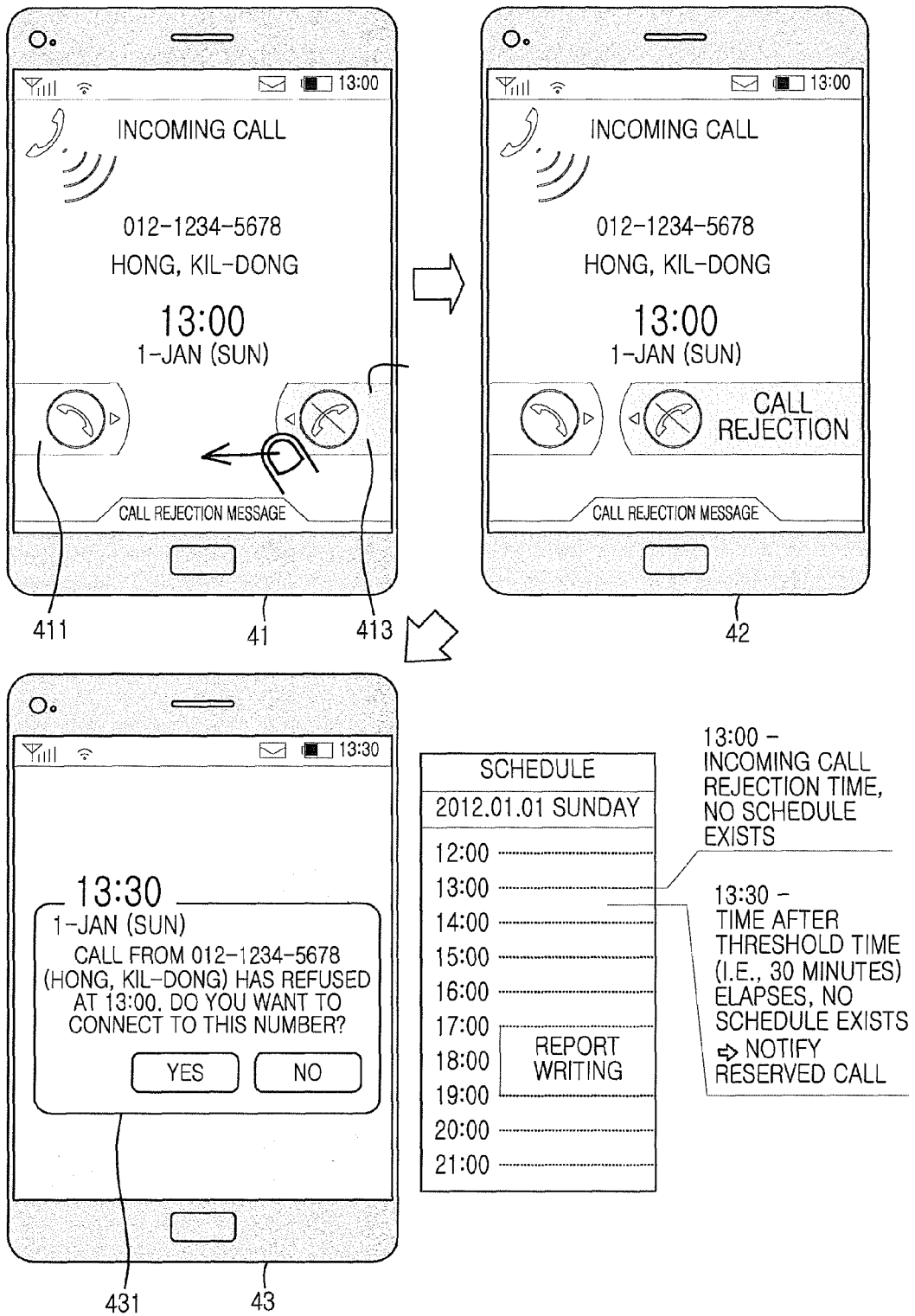
FIG. 4 to FIG. 8 illustrate an example user interface screen according to an embodiment of the present invention.

First, referring to FIG. 4, the electronic device 100 rejects the incoming call at a first time (i.e., 13:00), and if the first time (i.e., 13:00) does not belong to a time period of a specific schedule, calculates a second time (i.e., 13:30) which comes after a pre-set threshold time (i.e., 30 minutes) elapses from the first time (i.e., 13:00). If the second time does not belong to the time period of the specific schedule, the electronic device 100 determines the second time (i.e., 13:30) as the time of notifying the reserved call. This result corresponds to step 231 of FIG. 3.

Figure 5:
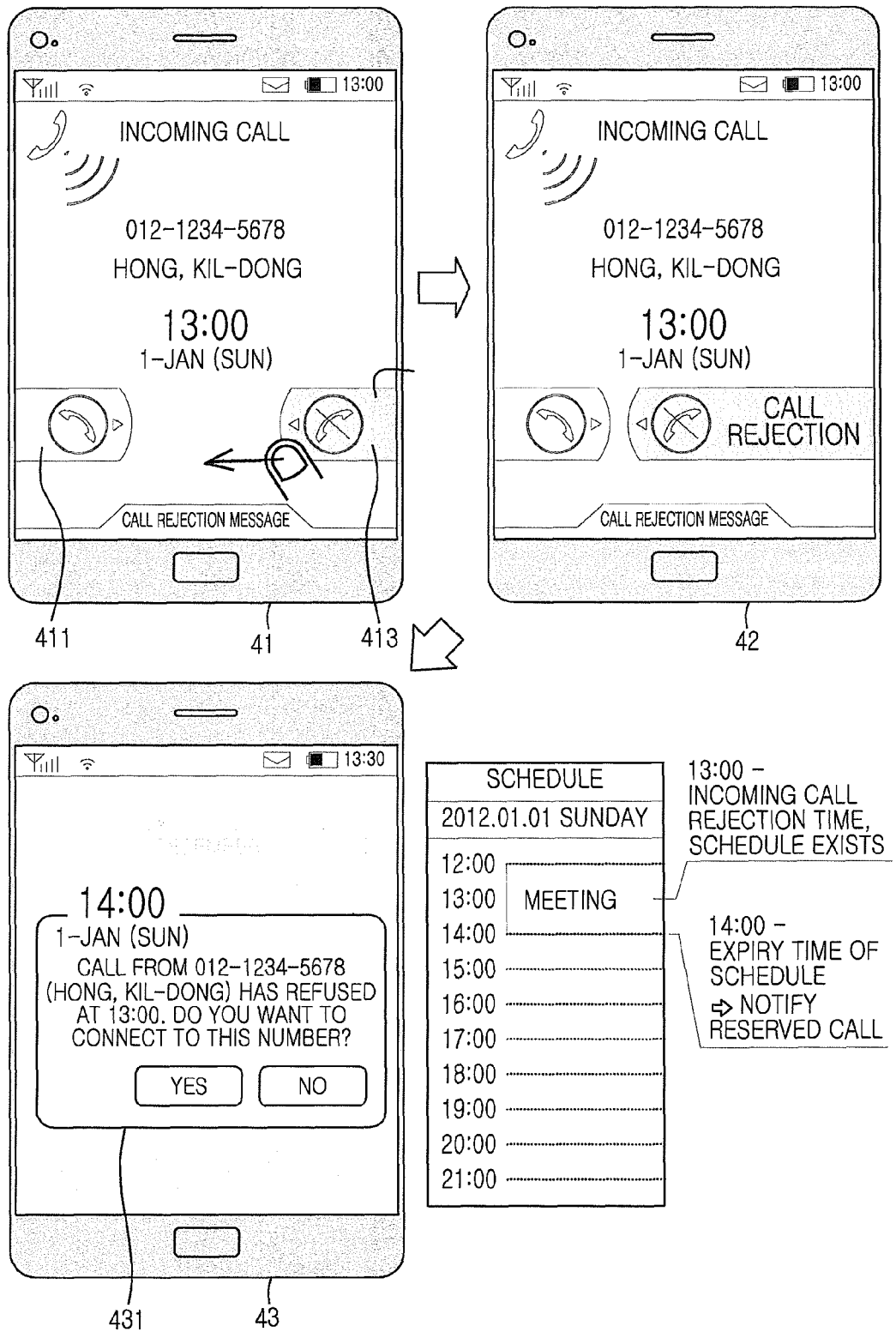

Second, referring to FIG. 5, the electronic device 100 rejects the incoming call at a first time (i.e., 13:00), and if the first time (i.e., 13:00) belongs to a time period (i.e., 12:00 to 14:00) of a specific schedule (meeting), determines an expiration time of the schedule (i.e., 14:00) as the time of notifying the reserved call. This result corresponds to step 229 of FIG. 3.

Figure 6:
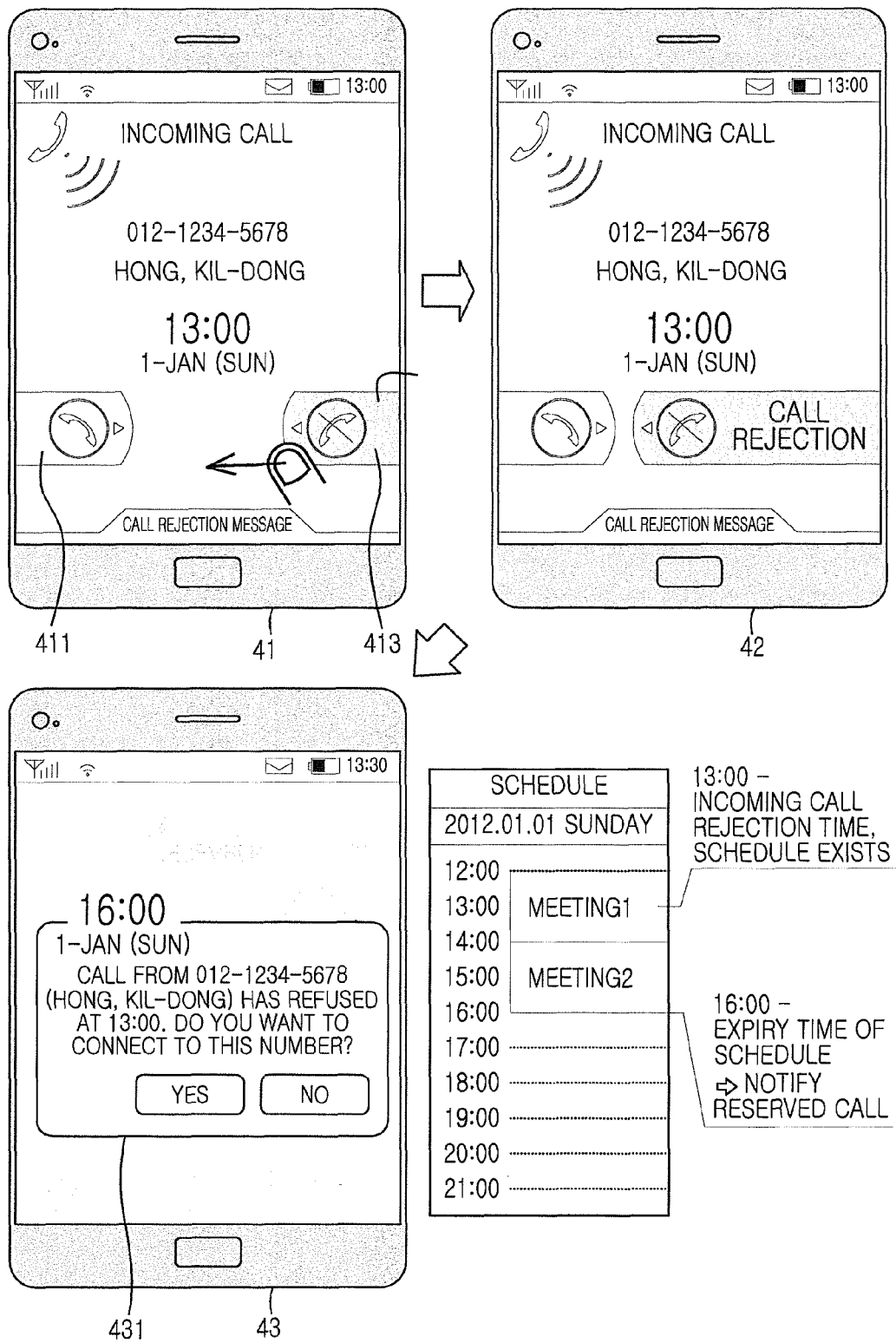

Third, referring to FIG. 6, the electronic device 100 rejects the incoming call at a first time (i.e., 13:00), and if the first time (i.e., 13:00) belongs to a time period of a specific schedule, determines an expiration time of the schedule as the time of notifying the reserved call. In particular, if a time period (i.e., 14:00~16:00) of a second schedule (i.e., meeting 2) subsequent to a time period (i.e., 12:00~14:00) of a first schedule (i.e., meeting 1) is registered, the electronic device 100 determines an expiration time (i.e., 16:00) of the second schedule as the time of notifying the reserved call. This result corresponds to step 229 of FIG. 3.

Figure 7:
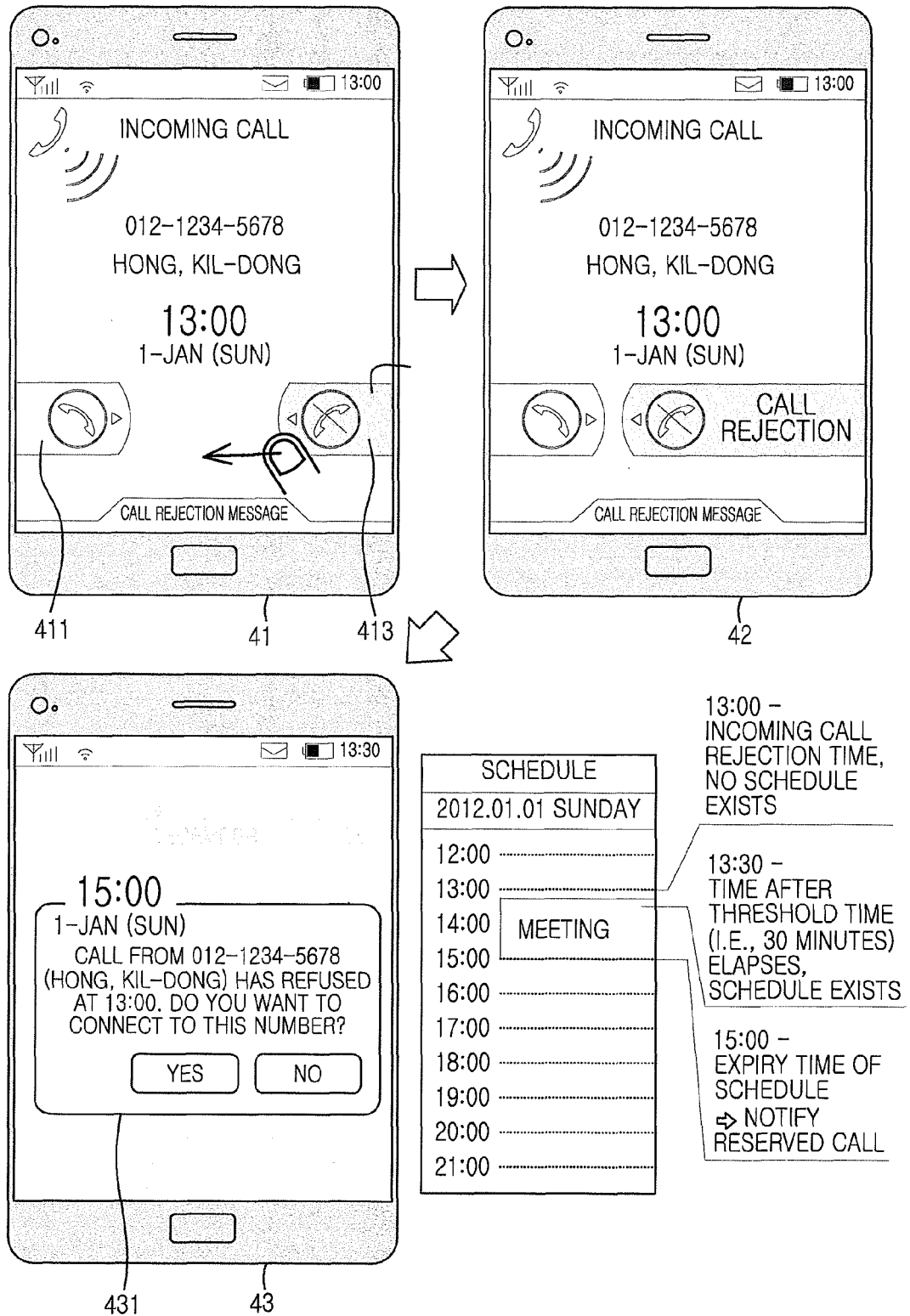

Fourth, referring to FIG. 7, the electronic device 100 rejects the incoming call at a first time (i.e., 13:00), and if the first time (i.e., 13:00) does not belong to a time period of a specific schedule, calculates a second time (i.e., 13:30) which comes after a pre-set threshold time (i.e., 30 minutes) elapses from the first time (i.e., 13:00). If the second time belongs to a time period (i.e., 13:10 to 15:00) of a specific schedule (i.e., meeting), an expiration time (i.e., 15:00) of the schedule (i.e., meeting) is determined as the time of notifying the reserved call. This result corresponds to step 227 of FIG. 3.

Figure 8:
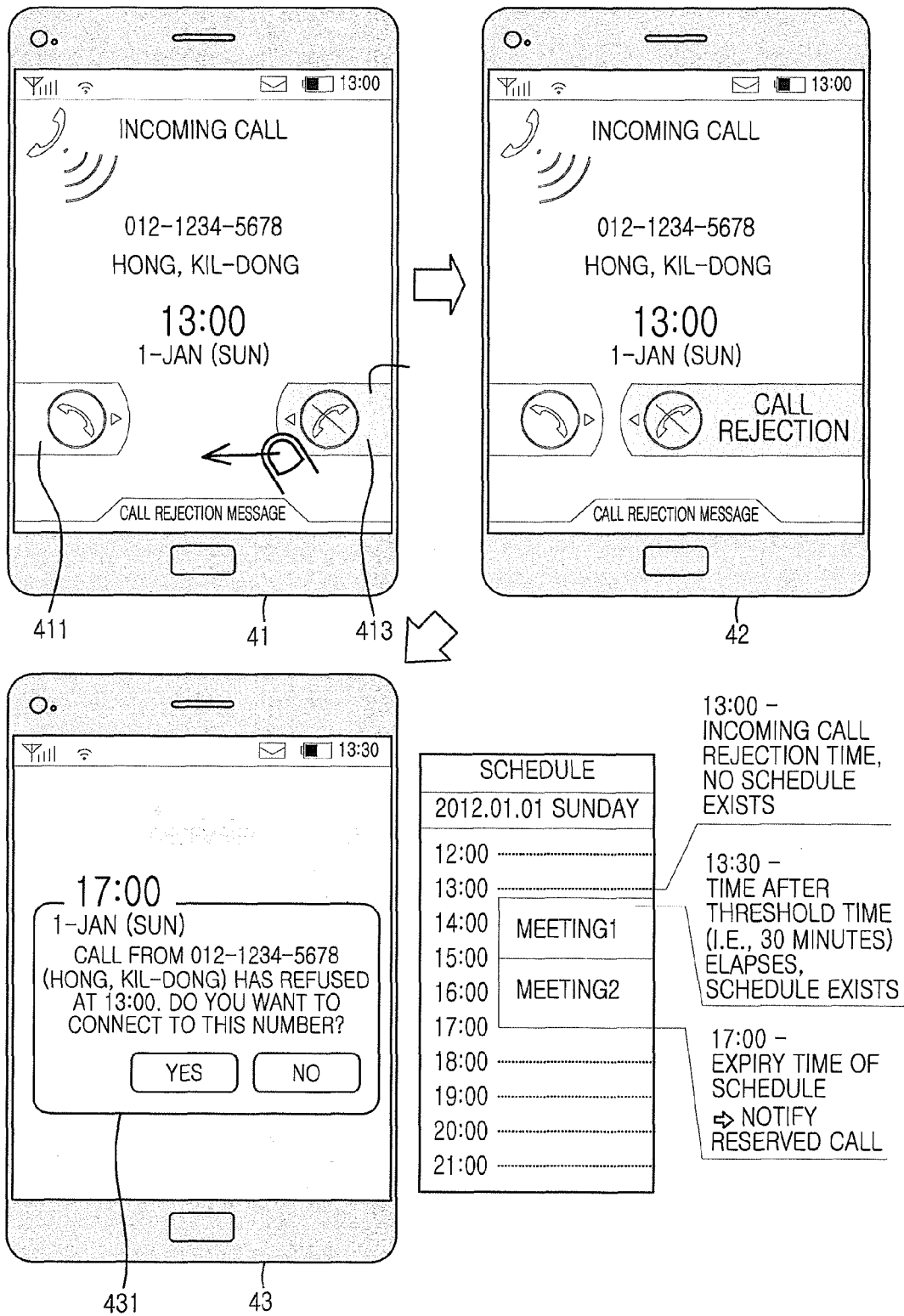

Fifth, referring to FIG. 8, the electronic device 100 rejects the incoming call at a first time (i.e., 13:00), and if the first time (i.e., 13:00) does not belong to a time period of a specific schedule, calculates a second time (i.e., 13:30) which comes after a pre-set threshold time (i.e., 30 minutes) elapses from the first time (i.e., 13:00). If the second time belongs to the time period of the specific schedule, the electronic device 100 determines an expiration time of the schedule as the time of notifying the reserved call. In particular, if a time period (i.e., 15:00~17:00) of a second schedule (i.e., meeting 2) subsequent to a time period (i.e., 13:10~15:00) of a first schedule (i.e., meeting 1) is registered, the electronic device 100 determines an expiration time (i.e., 17:00) of the second schedule as the time of notifying the reserved call. This result corresponds to step 227 of FIG. 3.

Figure 9:
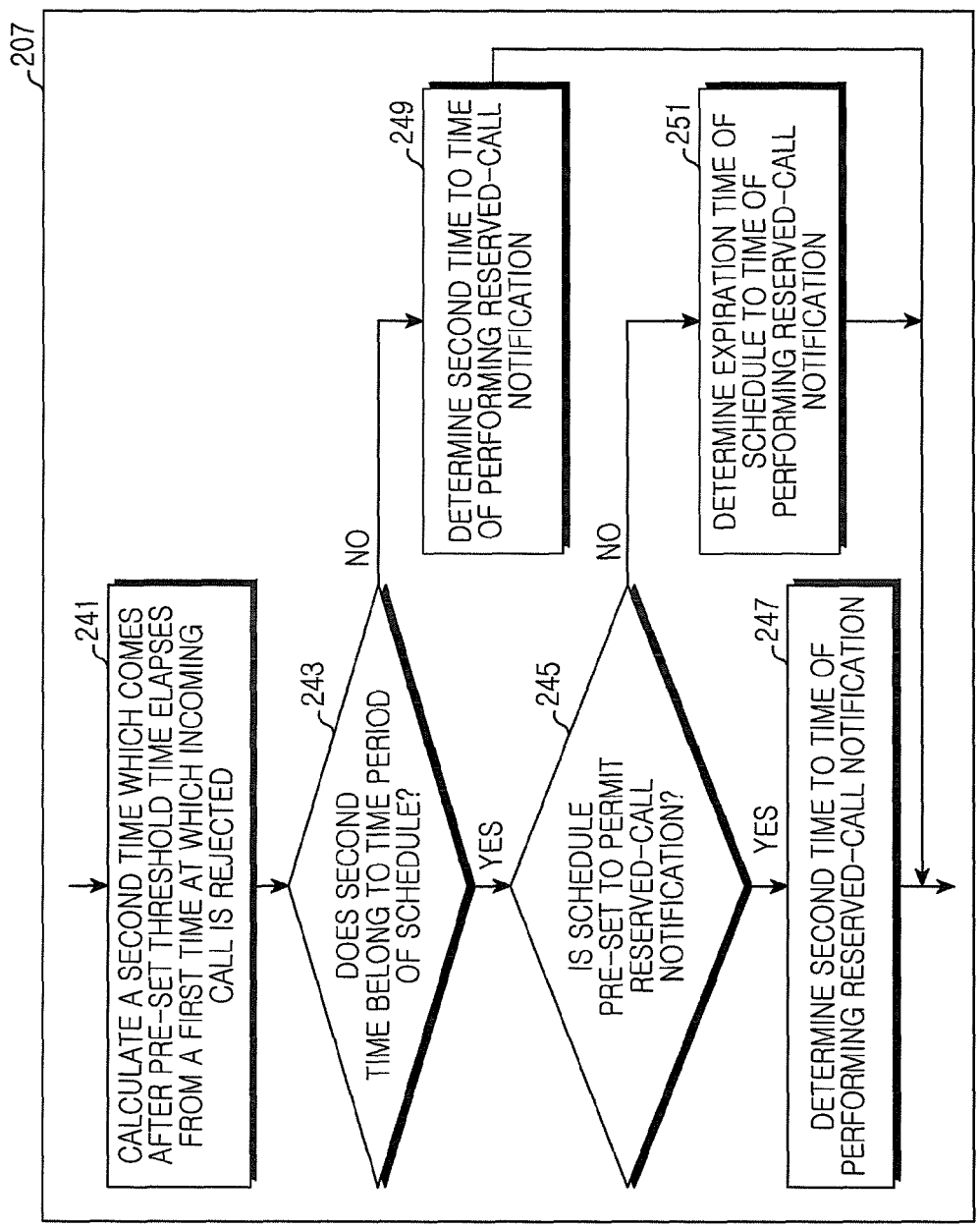
FIG. 9 illustrates an example process of determining a time of notifying a reserved call associated with an outgoing number of a rejected call by referring to a schedule according to an embodiment of the present invention.

FIG. 9 illustrates an example process of determining a time of notifying a reserved call associated with an outgoing number of a rejected call by referring to a schedule according to an embodiment of the present invention.

Referring to FIG. 9, the processor 122 calculates a second time which comes after a pre-set threshold time elapses from a first time of rejecting an incoming call (step 241).

The processor 122 identifies whether the second time belongs to a time period of a specific schedule (step 243). The time period of the schedule indicates any one of a time period of one schedule for permitting the reserved-call notification, a time period of one schedule for denying the reserved-call notification, a time period of a plurality of continuous schedules for permitting the reserved-call notification, and a time period of a plurality of continuous schedules for denying the reserved-call notification.

If the second time does not belong to the time period of the specific schedule, the processor 122 determines the second time as the time of notifying the reserved call (step 249). Otherwise, if the second time belongs to the time period of the schedule, the processor 122 determines whether the schedule is set to permit the reserved-call notification (step 245).

If the schedule is pre-set to permit the reserved-call notification, the processor 122 determines the second time as the time of notifying the reserved call (step 247). Otherwise, if the schedule is pre-set to deny the reserved-call notification, the processor 122 determines an expiration time of the schedule as the time of notifying the reserved call (step 251). If the time period of the schedule is a time period of a plurality of continuous schedules for denying the reserved-call notification, the processor 122 determines an expiration time of a last schedule as the time of notifying the reserved call.

FIG. 10 to FIG. 13 illustrate an example user interface screen according to an embodiment of the present invention.

Referring to FIG. 10 through FIG. 13, the electronic device 100 provides a first slide bar 511 configured to receive an incoming call and connecting the incoming call and a second slide bar 513 configured to reject the incoming call using a touch screen (step 51). When a user moves the first slide bar 511 from the left to the right, the electronic device 100 connects the incoming call. Otherwise, if the user moves the second slide bar 513 from the right to the left, the electronic device 100 rejects the incoming call (step 52).

The electronic device 100 determines a time of notifying a reserved call associated with an outgoing number of the rejected call by referring to a schedule of the user, and notifies the reserved call associated with the outgoing number when the determined time arrives (step 53). When the reserved call is notified, the electronic device 100 provides information of the rejected call, i.e., a phone number, a call rejection time, and the like, and enables the user to determine whether to make a call to the phone number.

The electronic device 100 determines the time of notifying the reserved call by using the following methods.

Figure 10:
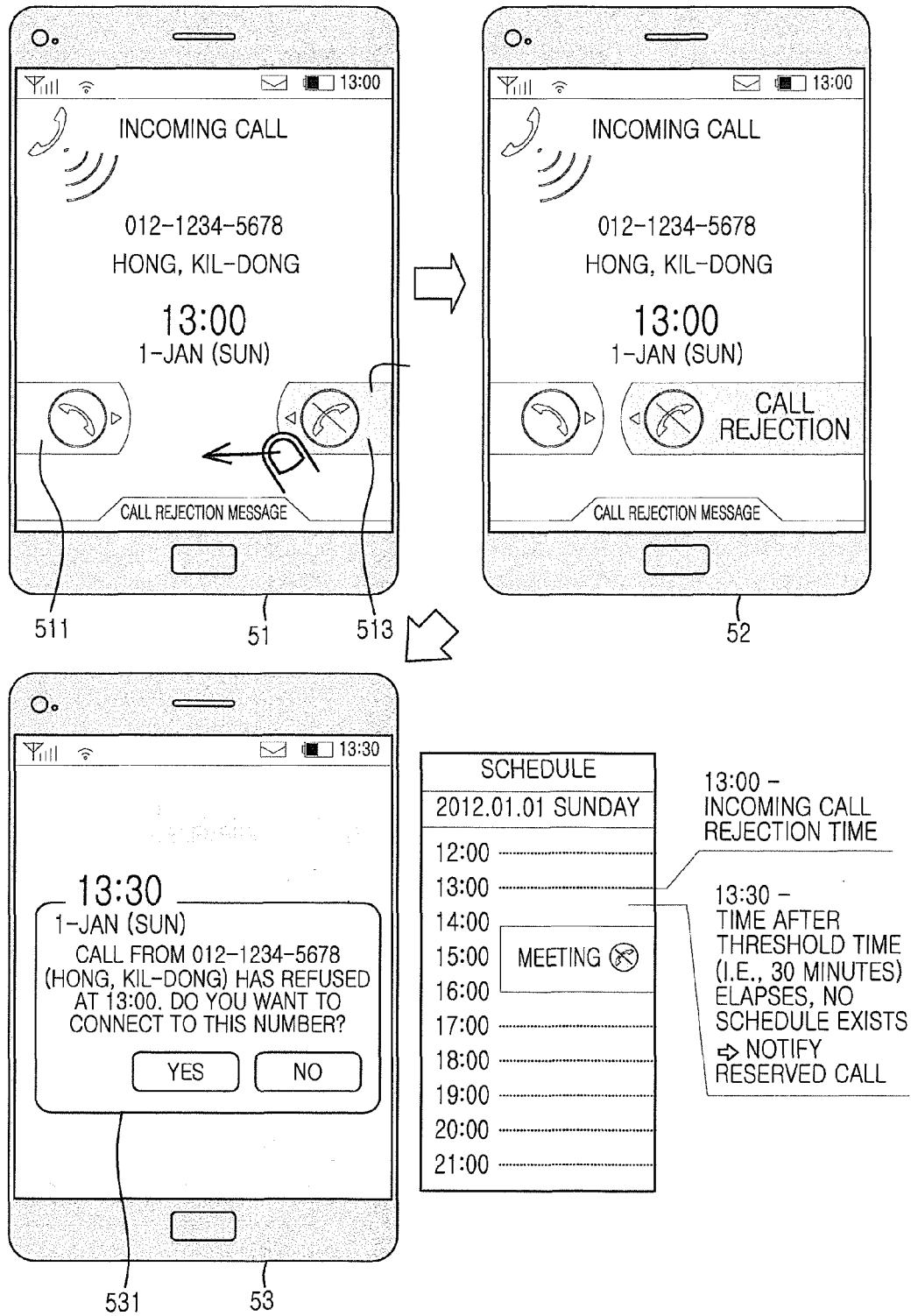
FIG. 10 to FIG. 13 illustrate an example user interface screen according to an embodiment of the present invention.

First, referring to FIG. 10, the electronic device 100 rejects the incoming call at a first time (i.e., 13:00), and calculates a second time (i.e., 13:30) which comes after a pre-set threshold time (i.e., 30 minutes) elapses from the first time (i.e., 13:00). If the second time does not belong to the time period of the specific schedule, the electronic device 100 determines the second time (i.e., 13:30) as the time of notifying the reserved call. This result corresponds to step 249 of FIG. 9.

Figure 11:
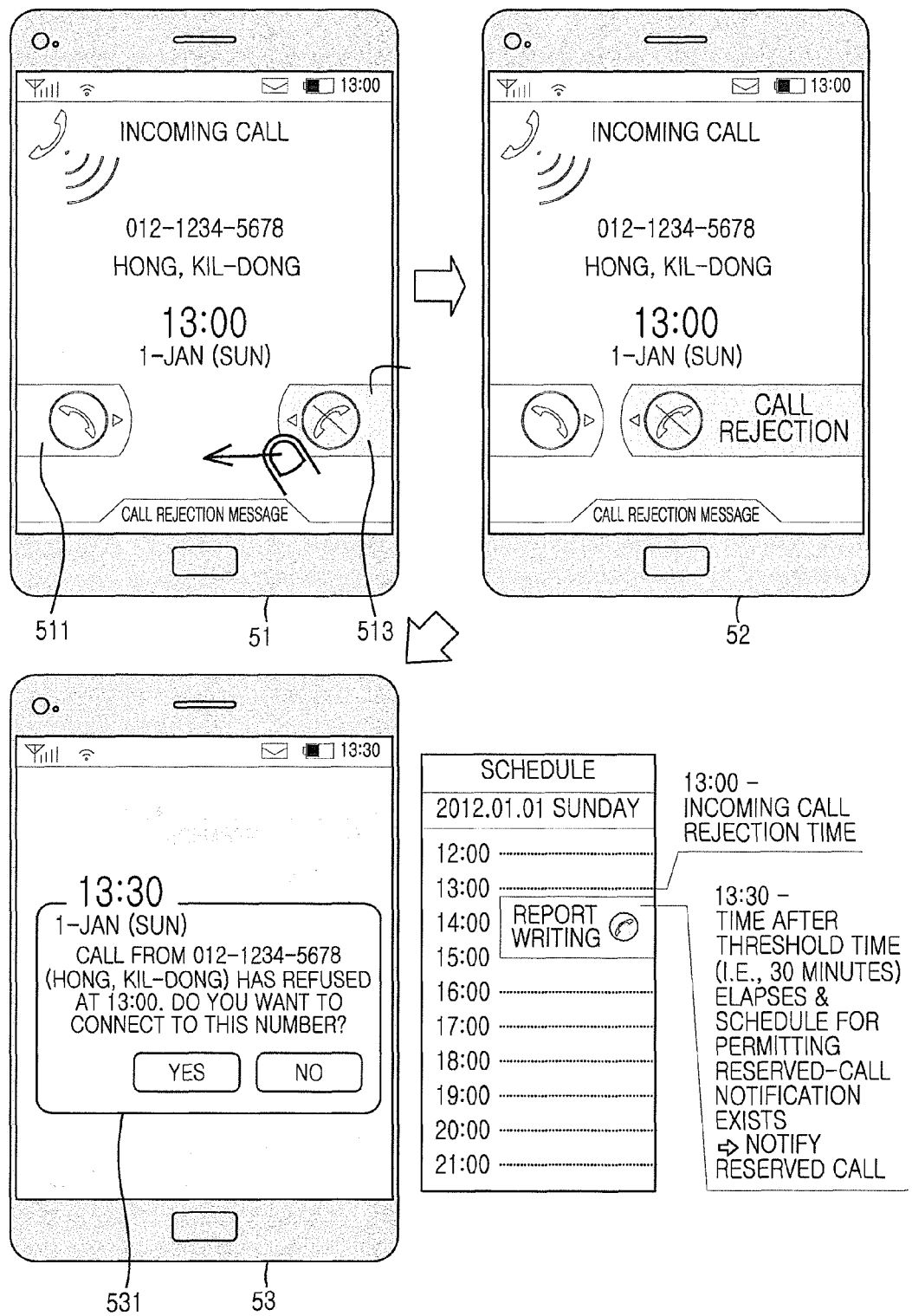

Second, referring to FIG. 11, the electronic device 100 rejects the incoming call at a first time (i.e., 13:00), and calculates a second time (i.e., 13:30) which comes after a pre-set threshold time (i.e., 30 minutes) elapses from the first time (i.e., 13:00). If the second time belongs to the time period (i.e., 13:10 to 15:00) of the specific schedule (report writing), the electronic device 100 identifies whether the schedule is pre-set to permit the reserved-call notification. If the schedule is pre-set to permit the reserved-call notification, the electronic device 100 determines the second time (i.e., 13:30) as the time of notifying the reserved call. This result corresponds to step 247 of FIG. 9.

Figure 12:
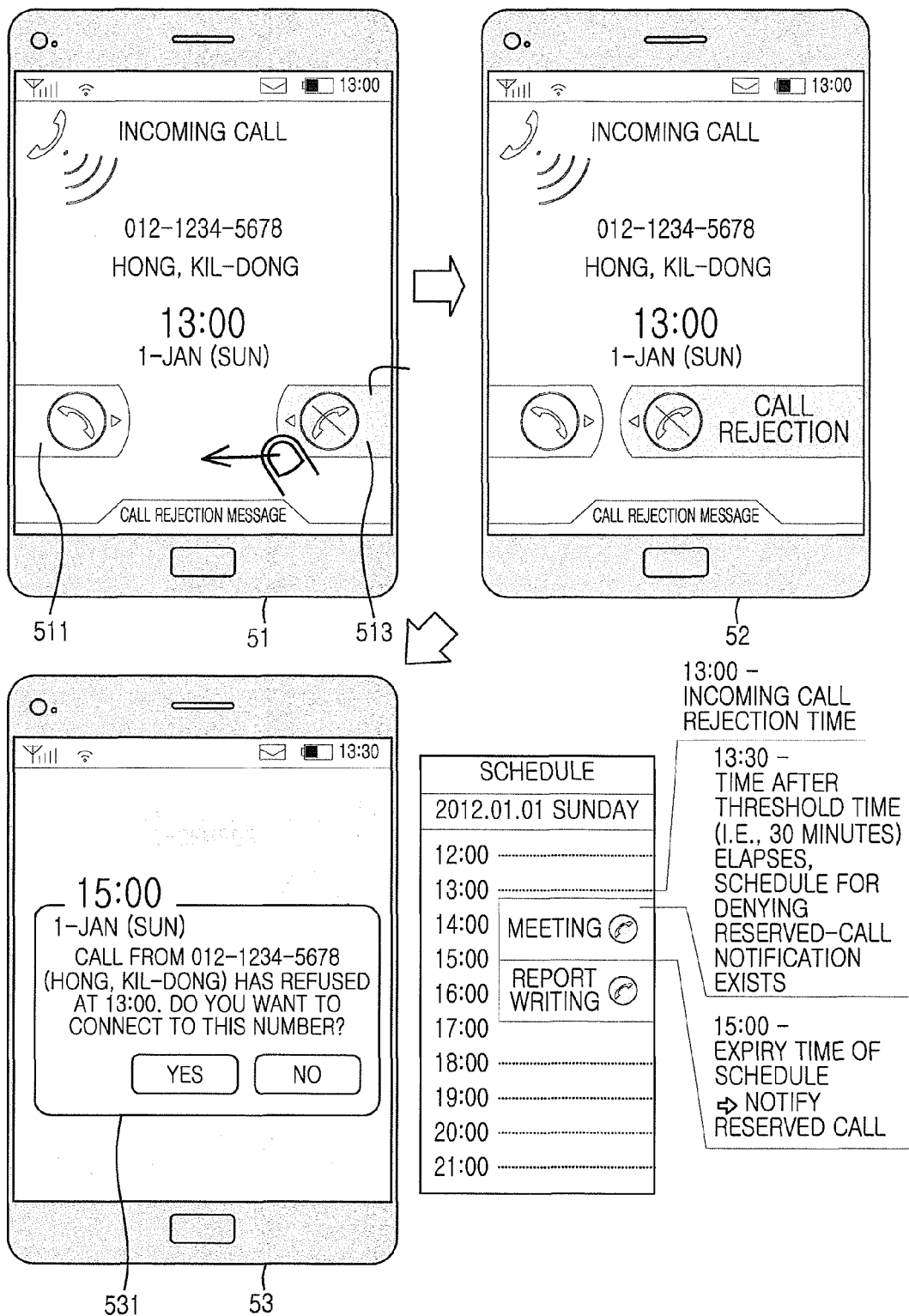

Third, referring to FIG. 12, the electronic device 100 rejects the incoming call at a first time (i.e., 13:00), and calculates a second time (i.e., 13:30) which comes after a pre-set threshold time (i.e., 30 minutes) elapses from the first time (i.e., 13:00). If the second time belongs to the time period (i.e., 13:10 to 15:00) of a first schedule (i.e., meeting), the electronic device 100 identifies whether the first schedule is pre-set to permit the reserved-call notification.

If the first schedule is pre-set to deny the reserved-call notification, the electronic device 100 identifies whether a time period (i.e., 15:00 to 17:00) of the second schedule (i.e., report writing) subsequent to the time period (i.e., 13:10 to 15:00) of the first schedule (i.e., meeting) is registered. If the time period of the second schedule subsequent to the time period of the first schedule is registered, the electronic device 100 identifies whether the second schedule (i.e., report writing) is set to permit the reserved-call notification.

If the second schedule is set to permit the reserved-call notification, the electronic device 100 determines an expiration time (i.e., 15:00) of the first schedule (i.e., meeting) as the time of notifying the reserved call. This result corresponds to step 251 of FIG. 9.

Figure 13:
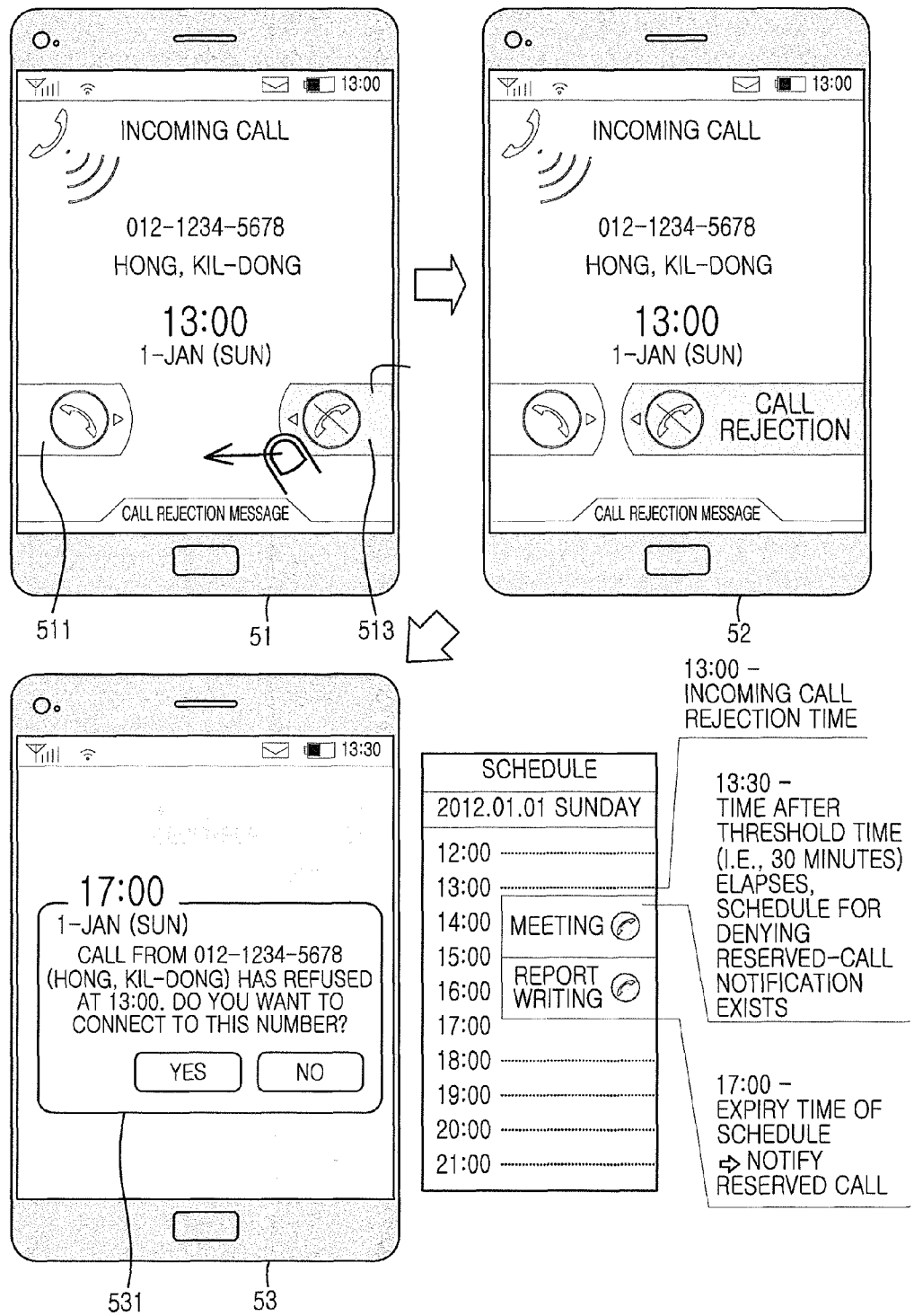

Fourth, referring to FIG. 13, the electronic device 100 rejects the incoming call at a first time (i.e., 13:00), and calculates a second time (i.e., 13:30) which comes after a pre-set threshold time (i.e., 30 minutes) elapses from the first time (i.e., 13:00). If the second time belongs to the time period (i.e., 13:10 to 15:00) of a first schedule (i.e., meeting 1), the electronic device 100 identifies whether the first schedule is pre-set to permit the reserved-call notification. If the first schedule is pre-set to deny the reserved-call notification, the electronic device 100 identifies whether a time period (i.e., 15:00 to 17:00) of the second schedule (i.e., meeting 2) subsequent to the time period (i.e., 13:10 to 15:00) of the first schedule (i.e., meeting 1) is registered.

If the time period of the second schedule subsequent to the time period of the first schedule is registered, the electronic device 100 identifies whether the second schedule (i.e., meeting 2) is set to permit the reserved-call notification. If the second schedule is set to permit the reserved-call notification, the electronic device 100 determines an expiration time (i.e., 17:00) of the first schedule (i.e., meeting 2) as the time of notifying the reserved call. This result corresponds to step 251 of FIG. 9.

Methods based on the embodiments disclosed in the claims and/or specification of the present invention can be implemented in hardware, software, or a combination of both. When implemented in software, computer readable recording medium for storing one or more programs (i.e., software modules) can be provided. The one or more programs stored in the computer readable recording medium are configured for execution performed by one or more processors in an electronic device such as a portable terminal. The one or more programs include instructions for allowing the electronic device to execute the methods based on the embodiments disclosed in the claims and/or specification of the present invention.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory may be plural in number. Further, the program can be stored in an attachable storage device capable of accessing the electronic device through a communication network such as the Internet, an Intranet, a Local Area Network (LAN), a Wide LAN (WLAN), a Storage Area Network (SAN), or a communication network configured by combining the networks. The storage device can access the electronic device through an external port. Furthermore, an additional storage device on the communication network can access a portable electronic device.

In conclusion, since the method and apparatus for notifying the reserved call of the electronic device according to the present invention notifies the reserved call associated with an outgoing number of the rejected call, the call can be prevented from missing caused by the call rejection, and the reserved call is notified at a property time by considering a user's schedule, thereby increasing user's satisfaction.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method to notify a reserved call of an electronic device, the method comprising:
   detecting a rejection of an incoming call;
   determining a time to notify the reserved call associated with an outgoing number of the rejected incoming call by referring to at least one predefined schedule, wherein determining the time to notify the reserved call comprises:
      determining a first time when the receiving call is rejected;
      calculating a second time which comes after a threshold time elapses from the determined first time;
      determining whether the calculated second time belongs to a time period of a schedule; and
      if the calculated second time belongs to the time period of the schedule, determining an expiration time of the schedule as the time to notify the reserved call; and
   notifying the reserved call associated with the outgoing number of the rejected incoming call when the determined time arrives.

2. The method of claim 1, wherein the determined time of notifying the reserved call associated with the outgoing number of the rejected incoming call is a time when the at least one schedule does not belong.

3. The method of claim 1, wherein determining the time to notify the reserved call associated with the outgoing number of the rejected incoming call by referring to the at least one predefined schedule comprises:
   if the determined first time does not belong to a time period of another schedule before the schedule, calculating a second time which comes after a threshold time elapses from the determined first time.

4. The method of claim 3, wherein determining the time to notify the reserved call associated with the outgoing number of the rejected incoming call by referring to the at least one predefined schedule comprises:
   if the first time belongs to the time period of the other schedule before the schedule, determining an expiration time of the other schedule before the schedule as the time to notify the reserved call.

5. The method of claim 3, wherein determining the time to notify the reserved call associated with the outgoing number of the rejected incoming call by referring to the at least one predefined schedule comprises:
   if the second time does not belong to the time period of the schedule, determining the second time as the time to notify the reserved call.

6. The method of claim 3, wherein the time period of the schedule or the time period of the other schedule indicates at least one period.

7. A method to notify a reserved call of an electronic device, the method comprising:
   detecting a rejection of a call;
   determining a time to notify the reserved call associated with an outgoing number of the rejected incoming call by referring to at least one predefined schedule, wherein determining comprises:
      determining a first time when the receiving call is rejected;
      calculating a second time which comes after a threshold time elapses the determined first time;
      determining whether the calculated second time belongs to a time period of a specific schedule;
      if the second time belongs to the time period of the specified schedule, determining whether the specified schedule is pre-set to permit the reserved-call notification; and
      when the specified schedule is pre-set to permit the reserved-call notification, determining the second time as the time of notifying the reserved call; and
   notifying the reserved call associated with the outgoing number of the rejected incoming call when the determined time arrives.

8. The method of claim 7, wherein determining the time to notify the reserved call associated with the outgoing number of the rejected incoming call by referring to the at least one predefined schedule comprises:
   if the second time does not belong to the time period of the specified schedule, determining the second time as the time of notifying the reserved call.

9. The method of claim 7, wherein determining the time to notify the reserved call associated with the outgoing number of the rejected incoming call by referring to the at least one predefined schedule comprises:
   when the specified schedule is not pre-set to permit the reserved-call notification, determining an expiration time of the specified schedule as the time of notifying the reserved call.

10. The method of claim 7, wherein the time period of the specified schedule indicates any one of the time period of one schedule for permitting the reserved-call notification, the time period of one schedule for denying the reserved-call notification, the time period of a plurality of continuous schedules for permitting the reserved-call notification, and the time period of a plurality of continuous schedules for denying the reserved-call notification.

11. An electronic device, the device comprising:
   at least one processer;
   a memory; and
   at least one module stored in the memory and configured to be executed by the at least one processor,
   wherein the module is configured to:
      detect a rejection of an incoming call;
      determine a time to notify a reserved call associated with an outgoing number of the rejected incoming call by referring to the at least one predefined schedule, wherein the module is configured to determine the time to notify the reserved call by:
         determining a first time when the receiving call is rejected;
         calculating a second time which comes after a threshold elapses from the determined first time;
         determining whether the calculated second time belongs to a time period of a schedule; and
         if the calculated second time belongs to the time period of the schedule, determining an expiration time of the schedule as the time to notify the reserved call; and
      notify the reserved call associated with the outgoing number of the rejected incoming call when the determined time arrives.

12. The device of claim 11, wherein the determined time of notifying the reserved call associated with the outgoing number of the rejected incoming call is a time when the at least one schedule does not belong.

13. The device of claim 11, wherein the module is configured to:
   if the determined first time does not belong to a time period of another schedule before the schedule, calculate the second time which comes after a threshold time elapses from the determined first time.

14. The device of claim 13, wherein the module is configured to:
   determine an expiration time of the other schedule before the schedule as the time to notify the reserved call if the first time belongs to the time period of the other schedule.

15. The device of claim 13, wherein the module is configured to:
   determine the second time as the time of notifying the reserved call if the second time does not belong to the time period of the schedule.

16. The device of claim 13, wherein the time period of the schedule or the time period of the other schedule indicates at least one time period.

17. An electronic device, the electronic device comprising:
   at least one processor;
   a memory; and
   at least one module stored in the memory that, when executed by the at least one processor, causes the at least one processor to:
      detect a rejection of an incoming call;
      determine a time to notify a reserved call associated with an outgoing number of the rejected incoming call by referring to at least one predefined schedule, wherein the at least one module, when executed by the at least one processor, causes the at least one processor to determine the time to notify the reserved call by:
         determining a first time when the receiving call is rejected;
         calculating a second time which comes after a threshold time elapses from the determined first time;
         calculating whether the calculated second time belongs to a time period of a specified schedule;
         if the second time belongs to the time period of the specified schedule, determining whether the specified schedule is pre-set to permit the reserved-call notification; and
         when the specified schedule is pre-set to permit the reserved-call notification, determining the second time as the time of notifying the reserved call; and
      notify the reserved call associated with the outgoing number of the rejected incoming call when the determined number arrives.

18. The device of claim 17, wherein the module is configured to:
   determine the second time as the time of notifying the reserved call if the second time does not belong to the time period of the specified schedule.

19. The device of claim 17, wherein the module is configured to:
   determine an expiration time of the specified schedule as the time of notifying the reserved call when the specified schedule is not pre-set to permit the reserved-call notification.

20. The device of claim 17, wherein the time period of the specified schedule indicates any one of the time period of one schedule for permitting the reserved-call notification, the time period of one schedule for denying the reserved-call notification, the time period of a plurality of continuous schedules for permitting the reserved-call notification, and the time period of a plurality of continuous schedules for denying the reserved-call notification.

* * * * *